United States Patent
Witt (10) Patent No.: US 9,552,306 B2
(45) Date of Patent: Jan. 24, 2017

(54) CONCURRENT VIRTUAL TAPE USAGE

(71) Applicant: CA, Inc., Islandia, NY (US)

(72) Inventor: Russell A. Witt, Plano, TX (US)

(73) Assignee: CA, Inc., Islandia, NY (US)

( * ) Notice: Subject to any disclaimer, the term of this patent is extended or adjusted under 35 U.S.C. 154(b) by 214 days.

(21) Appl. No.: 14/092,820

(22) Filed: Nov. 27, 2013

(65) Prior Publication Data
US 2016/0117267 A1   Apr. 28, 2016

(51) Int. Cl.
*G06F 12/14* (2006.01)

(52) U.S. Cl.
CPC .................................. *G06F 12/1466* (2013.01)

(58) Field of Classification Search
CPC  G06F 12/1433; G06F 12/145; G06F 12/1466; G06F 12/1475; G06F 2212/1004; G06F 2212/151
USPC ..... 703/21, 24, 27; 711/6, 150, 168; 726/27, 726/30
See application file for complete search history.

(56) References Cited

U.S. PATENT DOCUMENTS

| | | | | |
|---|---|---|---|---|
| 8,769,182 B1* | 7/2014 | Tu | ........................ | G06F 3/0605 711/111 |
| 2002/0188655 A1* | 12/2002 | Brown | .................. | G06F 3/0613 709/201 |
| 2003/0128454 A1* | 7/2003 | Basham | ................ | G06F 3/0601 360/69 |

* cited by examiner

*Primary Examiner* — Gary Portka
(74) *Attorney, Agent, or Firm* — Patent Capital Group (57) ABSTRACT

A request to access a virtual tape volume is identified and a lock status is maintained for the virtual tape volume. The lock status includes a shared status and an exclusive lock status. In shared status, it is determined whether the request includes a request for write access to the virtual tape volume. Concurrent access to the virtual tape volume can be allowed by two or more applications during the shared status based at least in part on whether the applications request for write access to the virtual tape volume.

27 Claims, 8 Drawing Sheets

CONCURRENT VIRTUAL TAPE USAGE

BACKGROUND

The present disclosure relates in general to the field of computer data storage, and more specifically, to managing access to virtual tape volumes.

Magnetic tape data storage technology has been actively utilized for computer data storage since the 1950s. Magnetic tape drives, as with other computer technology, has advanced over the intervening decades, with the storage capabilities of modern tape drives increasing exponentially. Some modern magnetic tape cartridges allow storage of multiple terabytes on a single cartridge. Storage and cost considerations have allowed physical tape drives to remain in use in modern systems despite the advent and widespread adoption of solid-state storage devices. For instance, tape libraries are maintained and used in many archival data stores. Modern systems can be configured to make use of both physical tape storage as well as solid-state storage. Indeed, some systems are configured to virtualize tape drive volumes by having data in direct access storage device (DASD) disk or solid state storage emulate physical tape volumes. Such "virtual tape" systems can present portions of a DASD disk or solid state storage component as tape libraries or tape drives for use with existing software that makes use of physical tape storage. Virtual tape records can appear to be stored entirely on tape cartridges when they are actually located in faster, hard disk storage. Virtual tape can be used, for instance, with a hierarchical storage management (HSM) system in which data is moved as it falls through various usage thresholds to slower but less costly forms of storage media, including physical tape. Virtual tape may also be used as part of a storage area network (SAN) where less-frequently used or archived data can be managed by a single virtual tape server for a number of networked computers. A virtual tape system can further offload processing involved in deciding whether data should be available in the faster disk cache or written onto a tape cartridge. The virtual tape system also can manage data so that more of the space on a tape cartridge is actually used.

BRIEF SUMMARY

According to one aspect of the present disclosure, a request to access a virtual tape volume is identified and a lock status is maintained for the virtual tape volume. The lock status includes a shared status and an exclusive lock status. In shared status, it is determined whether the request includes a request for write access to the virtual tape volume. Concurrent access to the virtual tape volume can be allowed by two or more applications during the shared status based at least in part on whether the applications request for write access to the virtual tape volume.

BRIEF DESCRIPTION OF THE DRAWINGS

Like reference numbers and designations in the various drawings indicate like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
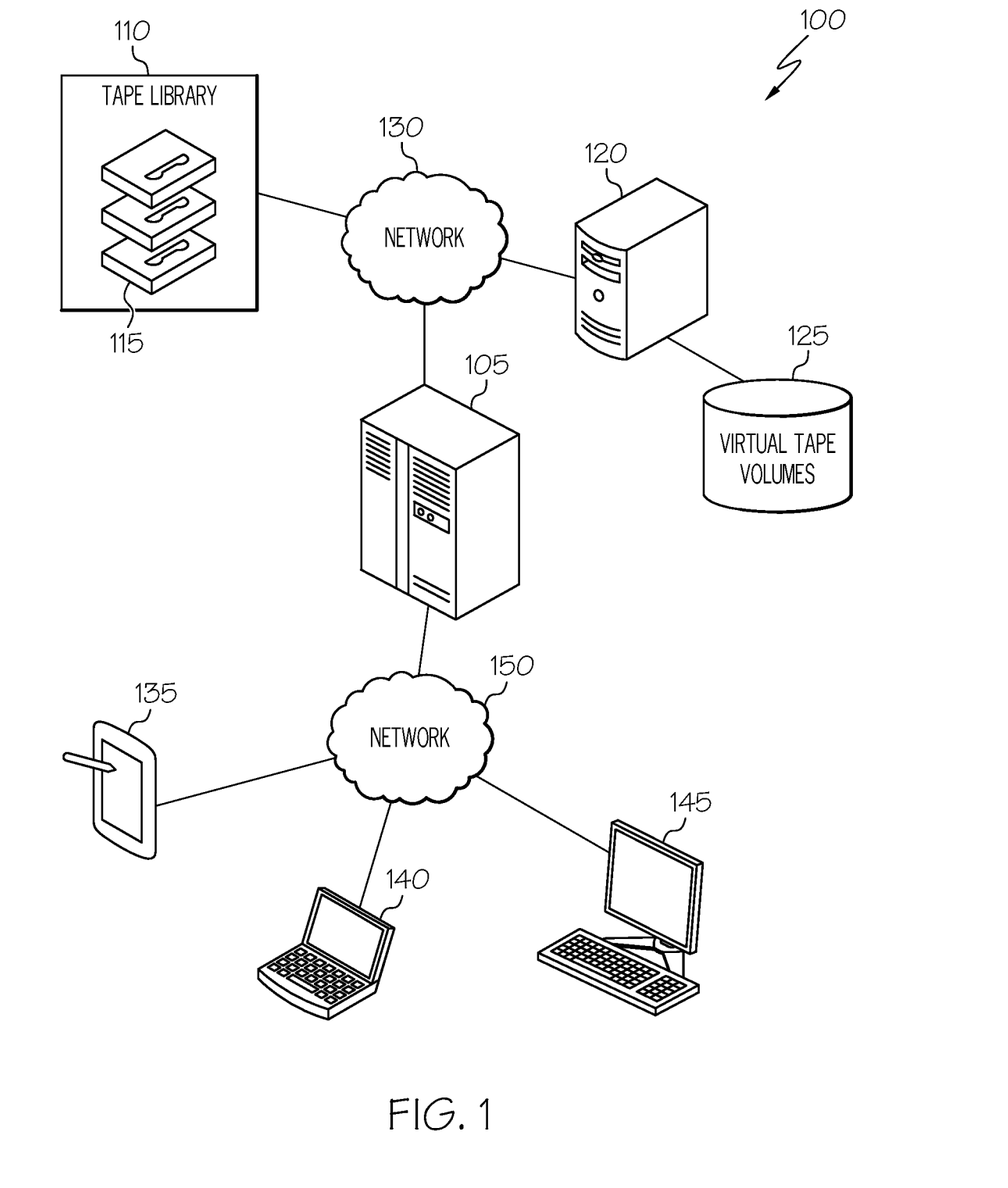
FIG. 1 is a simplified schematic diagram of an example computing system including an example virtual tape management system in accordance with at least one embodiment.

Referring now to FIG. 1, FIG. 1 is a simplified block diagram illustrating an example computing environment 100 including a mainframe computing system 105, or other computing device, utilizing data stored, at least in part, on tape drive storage, such as in a tape library 110 including one or more physical tape volumes 115. Such physical tape volumes 115 can include modern or legacy tape storage media, including tape cartridges, tape reels, tape cassettes, and so on. Further, computing system 105 can further utilize data from non-tape storage devices (e.g., 120) including sold-state and hard disk drives. Non-tape storage device 120 can include one or more virtual tape volumes 125. Further, a tape management system can be provided and implemented, at least in part, as machine-readable code executable by one or more processor devices of computers (e.g., 100, 120) within the environment 100. In one example implementation, tape management system can be implemented on a mainframe computing system (e.g., 105). Tape management system can be implemented on other devices remote from the computing system 105 while still allowing computing system 105 access to the data of the physical and virtual tape volumes managed by the tape management system, among other examples. In some instances, computing system 105 can access data on remote physical tape volumes 115 and virtual tape volumes through one or more networks (e.g., 130).

In one example, tape management system can include logic to facilitate shared access of virtual tape volumes 125. A multi-level lock can be employed to grant a shared lock or access level to a virtual tape during some instances, allowing multiple applications to concurrently access and use the virtual tape volume. In other instances, the shared lock can be transitioned to an exclusive lock to lock access to the virtual tape volume to a single application (e.g., when access to the virtual tape volume includes writes to the virtual tape volume). Concurrent access to a virtual tape volume can be predicated on determining that a tape volume requested by an application is, indeed, a virtual tape volume rather than a physical tape volume and the concurrent requests can each refer to and be processed as access requests targeting a particular volume identifier (e.g., a volume serial number (or VOLSER)). Locks applied to physical tape volumes managed by the tape management system can be restricted to exclusive locks.

In some implementations, one or more user devices (e.g., 135, 140, 145) can be included in computing environment 100 allowing one or more users to interact with and direct operation of one or more of computing system 105, tape library 110, storage device 120, as well as programs and applications offered with or accessing data and services provided by computing system 105, etc. For example, a user device (e.g., 135, 140, 145) can be used to allow a human user to interface with an application making use of archival data stored on one or both of physical tape volumes 115 and virtual tape volumes 125, among other examples. User devices (e.g., 135, 140, 145) can access computing system 105 as well as other remotely-provided systems, applications, and resources using one or more networks (e.g., 150). Such networks (e.g., 130, 150) can include local and worldwide networks, networks employing wired and/or wireless channels, as well as private and public (e.g., the Internet) networks, among other examples.

In general, "servers," "user devices," "mainframes", "computing devices," "network elements," "hosts," "clients," "computers," and "systems," etc. (e.g., 105, 110, 120, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 120, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a tape management system, virtual tape manager, or other system or subsystem of an example computing environment (e.g., 100) can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

In traditional systems, the operating system of a computer device managing access to tape volumes includes controls to prevent concurrent allocation and usage of the tape volumes. In some aspects, such allocation controls are historical to account for the fact that when a physical tape volume is being read or written to by one application, it is spooled to the physical position on the tape where the data resides (or is to reside), making concurrent access by another application of the same reel, cartridge (i.e., volume) untenable if not impossible. As virtual tape developed, the virtual tape volumes were to emulate the behavior of the physical tape volumes and the virtual nature of the virtual tape volumes were opaque to the systems consuming the virtual tape volumes. However, in traditional systems, concurrent access to virtual tape volumes has also been restricted despite the reality that data on some non-tape storage devices hosting the virtual tape volumes can be accessed concurrently by multiple applications. This can result in inefficient use of virtual tape resources.

Some solutions have attempted to end-run the allocation controls to enable concurrent access and use of virtual tape volumes by assigning a second, pseudo-identifier to a virtual tape volume prior to allocation to "trick" the allocation controls into believing that a request requesting access to a particular virtual tape volume identified by the pseudo-identifier (e.g., a pseudo VOLSER) belongs to a virtual tape volume other than the particular virtual tape volume currently in use by another application under its original or native VOLSER. While this technique can effectively permit concurrent access to a virtual tape volume by two or more applications, it introduces additional issues, such as complicating the enforcement of security and other policies on virtual tapes that are managed or mapped to the native VOLSER. For instance, security controls and tools, such as data access prevention tools, that perform tasks following allocation time (e.g., when steps to allocate the virtual tape volume resource to a requesting application are performed) may identify the newly-assigned pseudo-VOLSER used to facilitate concurrent access to a particular virtual tape volume and conclude that no data access rules or other policies are mapped to that VOLSER, when, in reality, one or more policies or rules are in place for the particular virtual tape volume, only mapped to the original, true, or "native" VOLSER assigned to the particular virtual tape volume. Consequently, in such examples, end-running allocation controls through aliasing of virtual tape volumes can complicate and even undermine other features, including important security checks in place for the virtual tape volumes. This can be particularly problematic in applications where the virtual tape volumes are used in the storage or archiving of sensitive data, among other issues and considerations.

In an example improved system, multi-layered access rights, or locks, can be defined and maintained for tape volumes in a system. For instance, tape volumes can have a lock applied defining whether access to the volume can be shared (i.e., concurrently accessed by two or more distinct applications) or is to be exclusive (i.e., access restricted to a single application). Further, a queue can be provided and managed such that when an access request for a tape volume is received while the tape volume is in an exclusive lock state, the application making the request is queued such that it is granted access when the exclusive lock held by another application is released. When the tape volume is a virtual tape volume and in a shared lock state, two or more applications can concurrently access the tape volume to perform input processing, or read-only operations (e.g., receiving data from the tape volume that is "input" to the requesting application).

Figure 2:
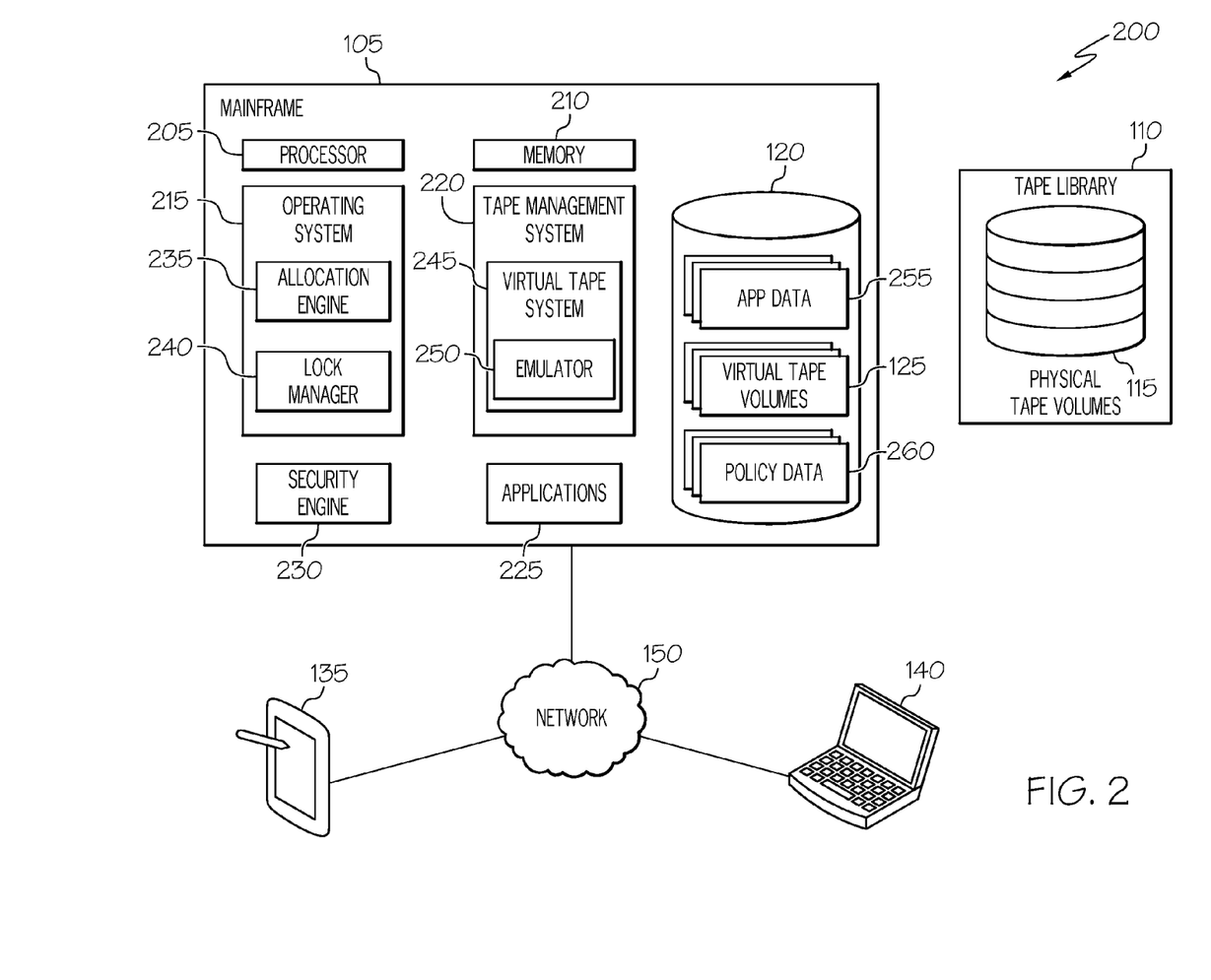
FIG. 2 is a simplified block diagram of an example computing system including an example virtual tape management system and an example lock manager in accordance with at least one embodiment.

At least some of the systems described in the present disclosure, such as the systems of FIGS. 1 and 2, can include functionality providing at least some of the above-described features that, in some cases, at least partially remedies or otherwise addresses at least some of the above-discussed issues, as well as others not explicitly described herein. For instance, turning to the example of FIG. 2, a simplified block diagram 200 is shown illustrating an example environment including an example implementation of a mainframe computer system 105. In this particular example, mainframe 105 can include an operating system 215 and applications 225 that can be used to access data stored in one or both of virtual tape volumes 125 and physical tape volumes 115 (such as tape volumes 115 in a tape library system 110). The mainframe 105 can include one or more data processing apparatus, or processor devices 205, as well as one or more memory elements 210, including memory elements storing machine-executable instructions executable by the processor 205 to realize functionality of one or more software- and/or hardware-based components. Such components can include, for example, operating system 215, tape management 220, application 225, security engine 230, among other potential examples. Further, while the components (e.g., 215, 220, 225, 230, 235, 240, 245, 250) in the example of FIG. 2 are illustrated as at least partially hosted on or local to the mainframe 105, in other implementations, one or more of such components can be provided at least in part on separate computing devices remote from the mainframe 105 (or another computer device), such as examples where applications 225 are remotely hosted and served to mainframe 105 or where tape management system 220 is deployed remote from the mainframe (such as in connection with remotely-hosted virtual tape volumes), among other examples.

In one example, operating system 215 can include an allocation engine 235 and lock manager 240. In some instances, functionality provided by one or both of allocation engine 235 and lock manager 240 can be provided by other components in environment 200, such as in connection with tape management system 220. An example allocation engine 235 can include functionality for allocating resources to one or more applications. Such resources can include files stored on hard drives, optical media, and other non-tape storage media, as well as files and data stored on physical tape volumes (e.g., 115). "Allocation time" can involve the identification and location of a resource requested by a particular application (e.g., 225). In one example, allocation time can include determining whether the resource is stored on a tape volume or not, as well as determining whether a requested tape volume is a physical tape volume or a virtual tape volume. In the case of a tape volume (virtual or physical), the requesting application can be identified together with the VOLSER (or another unique identifier) of the requested tape volume.

Following allocation of a resource on a tape volume, the tape volume can be attempted to be opened, in that the requesting application 225 is granted access to the tape volume (identified by the determined VOLSER). During an "open time" it can be determined whether the resource and its media (e.g., physical tape volume 115 or virtual tape volume 125) are accessible or available to a particular requesting application 225 and can be opened for access by the application 225. For instance, during open time, the availability or status of the requested resource can be determined. In one example, locks can be applied to at least a portion of the resources or storage devices of a system. For instance, a multi-level lock can be defined for tape volumes. A lock manager 240 can be employed to manage the lock that is to apply to a particular resource or storage device. For example, a lock manager 240 can manage the status of locks that are applied to physical and virtual tape volumes in environment 200.

In one example, each tape volume can initially be assigned a shared lock status. The lock manager 240 can track the real-time lock status of each physical and virtual tape volume and manage transition from one lock level, or status, to another. When a request to access a particular tape volume is granted by the system, the lock can be changed for the particular tape volume. If it is determined that the tape volume is a physical tape volume (e.g., 115), an exclusive lock can be assigned to persist on the physical tape volume until access by the application 225 has concluded. This can be the cases regardless of the type of access requested by the application 225, in some instance. However, upon determining that the requested tape volume is a virtual tape volume, the nature of the requested access can first be determined prior to assigning (or maintaining) the lock status during the application's access of the virtual tape volume. In cases where the requested access involves any type of output processing (or writes or updates of the virtual tape volume (e.g., "outputs" of the requesting application)), the lock status of the virtual tape volume can be changed to "exclusive" to prevent concurrent access to the tape volume by another application. Such output processing can include writes, write/reads, read/writes, updates, etc. If it is determined that access of the particular virtual tape volume is for input processing only (e.g., for read-only access), the shared status lock for the virtual tape volume can be maintained during the duration of the application's access. This can permit other applications also requesting read-only access to the virtual tape volume to request and be granted concurrent access to the same virtual tape volume identified by the same VOLSER.

During open time, the nature of the lock at the time of a request for a particular virtual volume can be determined. For instance, operating system 215 and/or the requesting application (e.g., 225) can identify that a requested virtual tape volume is under exclusive lock, blocking a competing access request, or under shared lock blocking a competing access request involving at least some output processing by the application. Where the requesting application 225 is blocked by virtue of a preceding lock status, the requesting application can then be queued, for instance, in a first-in-first-out (FIFO) queue, to be granted access to the requested virtual tape volume following release of locks by other applications currently accessing the virtual tape volume or otherwise with priority in the queue. The queue for each virtual tape volume can be managed, in some implementations, by lock manager 240. Application 225 can also include functionality for use in connection with management of the virtual tape volume queue. For instance, application 225 can identify that it is in a queue for a particular requested virtual tape volume (e.g., 125) and can periodically ping the operating system (and/or lock manager 240) to determine whether a preceding lock for the volume has been released, receive updates on the application's queue position, and determine whether the application 225 is available to access, or open, the requested virtual tape volume.

Typically, in systems that employ pseudo-VOLSERs to facilitate concurrent tape volume access, the pseudo-identifier is assigned to a requested virtual tape volume prior at open time (i.e., during allocation time). Effectively, hiding the true identity of the virtual tape volume can allow concurrent access to be granted despite allocation controls in place for accessing tape volumes within a system. However, other processes that identify tape volumes by their VOLSER (or other identifier) can also be affected by solutions that employ such aliasing of virtual tape volumes in competing access request. For instance, security services, scans, and checks performed, for instance by a security engine 230 and other security tools at open time can apply security policies specific to a particular tape volume. Generating and utilizing an alias, such as a pseudo-VOLSER, for a particular virtual tape volume can cause security tools (e.g., 230) to miss that a particular access request identifying the particular virtual tape volume by the pseudo-VOLSER applies to a virtual tape volume to which one or more security policies apply. For instance, data access protection tools can control access to particular records and tape volumes, restricting access to certain VOLSERs to a certain subsets of applications, clients, users, etc. In one particular example, applying a pseudo-VOLSER to a request for a particular virtual tape volume can grant concurrent access to the particular virtual tape volume, but, at the same, time potentially end-run security tools and other components performing tasks on the particular virtual tape volume based on an identification of the tape volume's VOLSER, such as granting access to the particular virtual tape volume to an unauthorized application or user. Other security tasks that can also be potentially threatened by aliasing-based concurrent tape access solutions including, for example, file-name validation based on the VOLSER, among other examples.

A tape management system 220 can be provided for managing a system's (e.g., mainframe's 105) access and use of tape volumes (e.g., 115, 125). Tape management system 220 can manage access to physical tape volumes 115 in one or more tape libraries by various applications. Tape management system 220 can further include a virtual tape system 245 for providing virtual tape volumes hosted on one or more non-tape storage elements (e.g., 120). Virtual tape volumes 125 can be hosted along with other (e.g., non-virtual tape) records and data for use by other programs and component in the system, such as application data 255 of one or more applications 225 and security policy data 260 and other data for use by one or more security tools (e.g., security engine 230), among other examples. Virtual tape system 245 can include an emulation engine and other components to cause a section of a non-tape storage medium (such as a direct access storage device (DASD) cache) to emulate a physical tape volume as virtual tape. The system accessing the resulting virtual tape volume can be ignorant of the fact that the tape volume is virtual. Further, in some instances, records of virtual tape volumes 125 can be migrated to physical tape volumes 115, for instance, to archive or back-up virtual tape records. The VOLSERs of the virtual tape can be mapped to the VOLSER of the physical tape volume upon which the virtual tape resources were written to and the tape management system 220 can cause subsequent requests for a VOLSER belonging to a once-virtual tape resource to be routed to a location on a VOLSER of the physical tape volume containing the backup of the virtual tape records, among other examples and features.

Tape management system 220 can also include functionality for managing locks applied to tape volumes 125 managed by tape management system 220. In some implementations, tape management system can intercept all open requests for resources stored on tape volumes, either virtual or physical. The tape management system 220 can identify the nature of the request to determine whether the access is read-only (i.e., input only) access or includes writes (i.e., output processing). During open time the nature of the request is determined as well as the current lock status of the requested tape volume. Further, it is determined, by the tape management system 220, whether the requested tape volume is a virtual tape volume or physical tape volume. The tape management system 220 can communicate with the operating system 215, such as with lock manager 240, to negotiate whether a particular access request is to be allowed or not based, for example, on the type of tape volume (e.g., virtual or physical), the nature of the access request (e.g., read-only access vs. write access), and whether the tape volume is currently being accessed by another application. Such information can be gathered, in some instances, by tape management system 220 and communicated to lock manager 240. For instance, when a request is received from an application for write access to a virtual tape volume when no other application is accessing the particular volume, a default shared lock for the virtual tape volume can be switched to exclusive lock for the duration of the particular application's use of the tape volume. In some implementations, all requests for access to physical tape volumes can result in an exclusive lock being applied. In some implementations, physical tape volumes can have an exclusive lock persistently applied to the tape volume (e.g., as a default), negating the switching of lock status for physical tape volumes.

It should be appreciated that other implementations can be utilized to manage a multi-level lock for tape volumes in a system. For instance, some of the functionality of operating system 215 utilized to manage locking of tape volumes (e.g., lock manager 240) can be implemented on tape management system 220. Indeed, in some implementations, tape management system 220 can be hosted by a computing device separate or remote from mainframe 105. Likewise, functionality of tape management system 220 described as facilitating multi-level locks for tape volumes can be instead implemented within operating system 215, among other examples. As one illustrative example, in one alternate implementation, traditional locking of tape volumes can be utilized, with locking of a tape volume occurring any time a new access request is to be granted. However, in this alternate implementation, tape management system 220 can be equipped with functionality for eliminating or removing the lock and replacing the lock with a multi-level lock as described herein allowing instances where the requested tape volume is granted a shared lock in some instances to permit concurrent access by two or more applications and an exclusive lock to lock limit access to a single application in other instances. Indeed, no lock can be provided during allocation and locking management can be provisioned entirely by tape management system 220 in such examples, with either a shared or exclusive lock being applied when tape management system 220 is passed and analyzes the request (e.g., in response to a determination (e.g., during allocation time) that the request is for a tape volume managed by the tape management system)), among other potential alternative implementations.

Figure 3A:
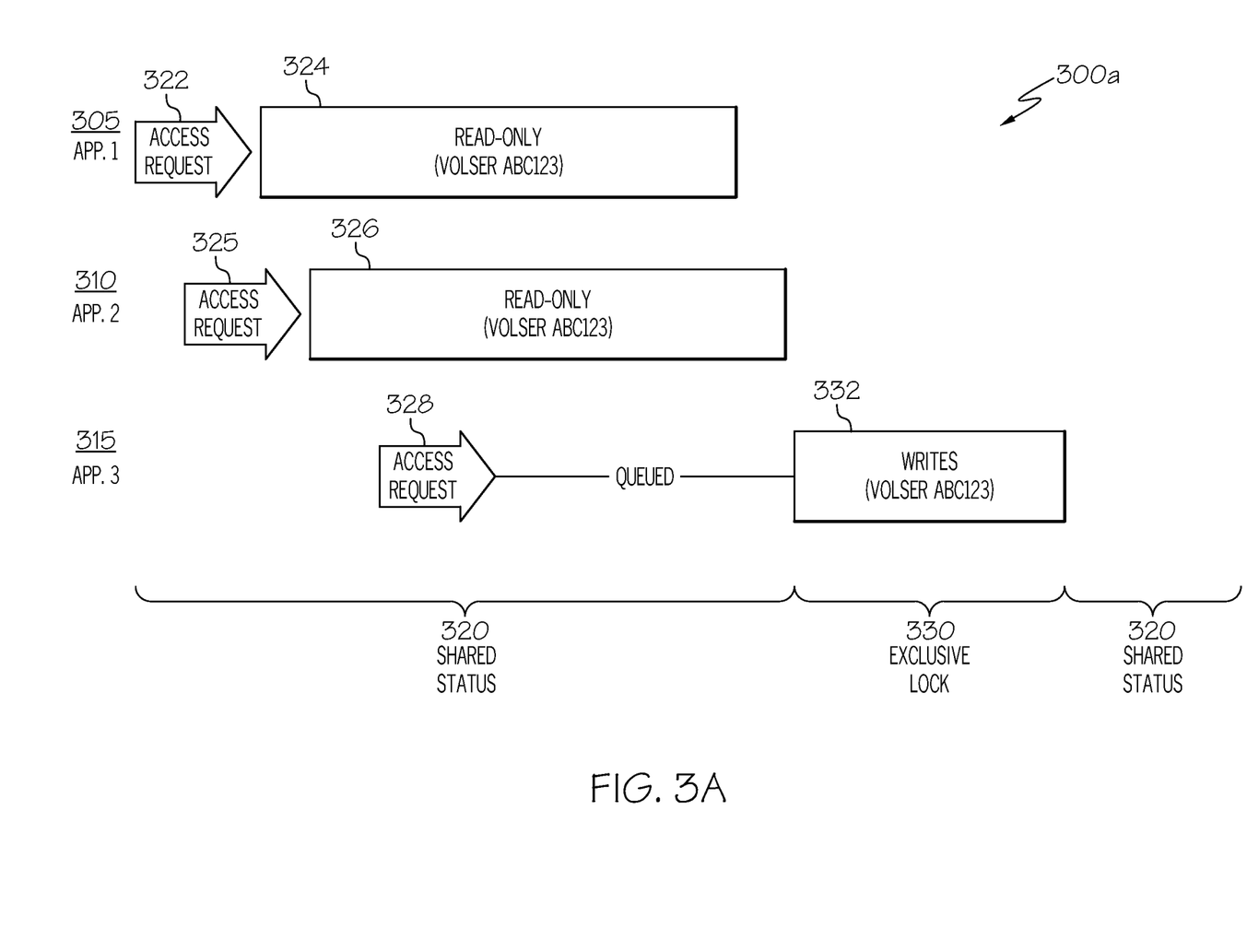
FIGS. 3A-D are simplified block diagrams illustrating example lock management of an example virtual tape volume in accordance with at least some embodiments.

Turning now to FIGS. 3A-3D, example block diagrams 300a-d are shown illustrating example lock management of an example virtual tape volume in accordance with at least some embodiments. In the example of FIG. 3A, a first application 305 makes a request 322 to access a virtual tape volume (e.g., VOLSER "ABC123"). At the time of the request, a shared lock status 320 can be applied to the virtual tape volume. It can be determined (e.g., by a tape management system managing the virtual tape volume) that the access request 322 of the first application 305 is a read-only request. As a result of the access request 322 being for a virtual tape volume (e.g., rather than for a physical tape volume) and the access request 322 being a read-only (or input-only) request, access 324 to the virtual tape volume can be granted to the first application 305 and the shared lock status 320 can be maintained during the access 324.

A subsequent request 325 can be received for the same virtual tape volume from a different, second application 310. The request 325 can be analyzed to determine that the request 325 is also a read-only request. Based on the request 325 being a read-only request and the tape volume (VOLSER ABC123) having a shared lock status 320, concurrent access 326 to the virtual tape volume can be granted to the second application 310 based on the request 325 and the shared status 320 can be further maintained throughout the duration of the access 324, 326 by applications 305, 310.

Figure 3B:
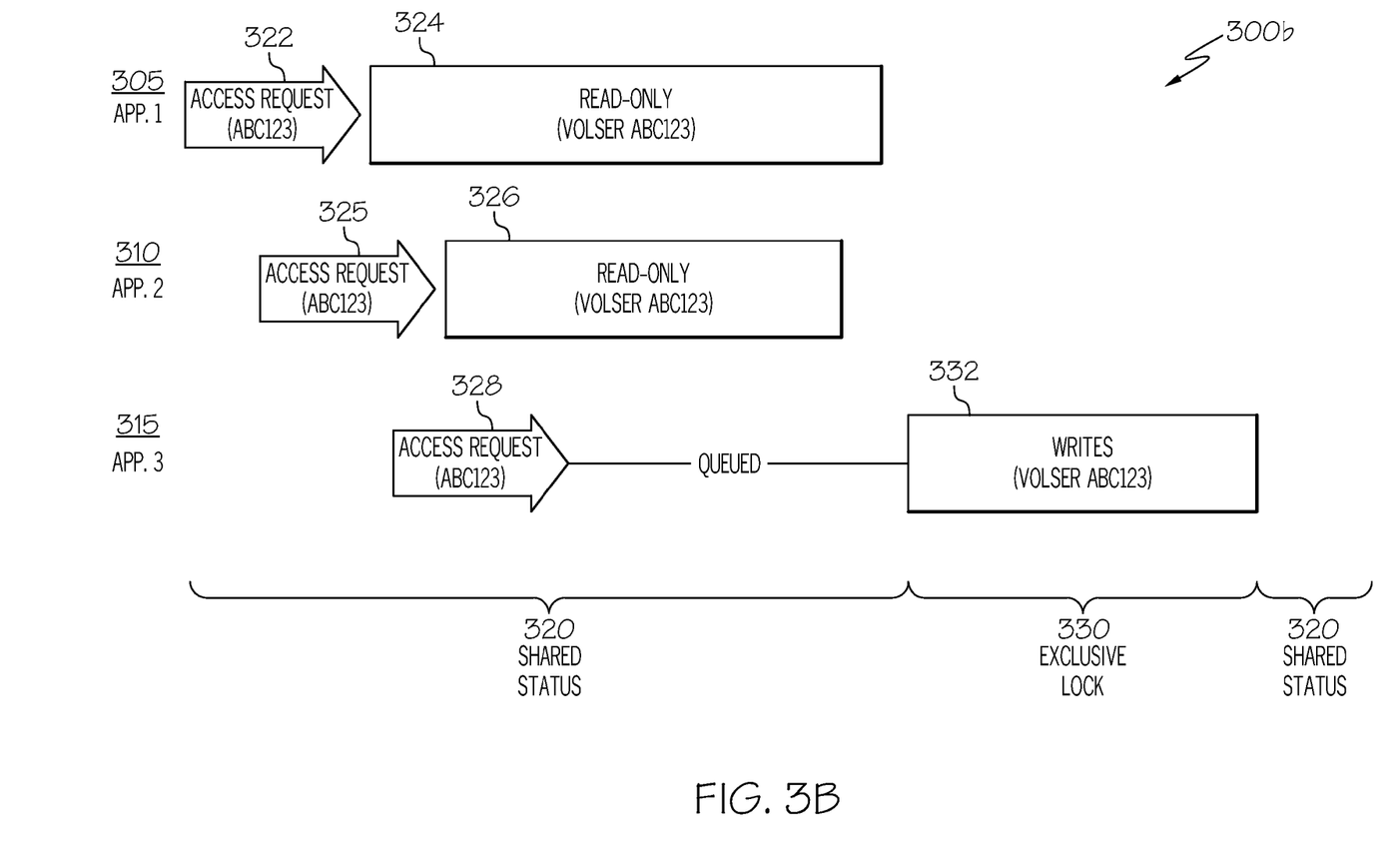

Requests (e.g., 328) for a virtual tape volume (e.g., VOLSER ABC123) can be further received (e.g., from application 315) while other applications 305, 310 access the virtual tape volume under a shared lock 320. However, in the present example, if the access request 328 is a request to access the tape volume for any form of output processing, such as access that includes writes, read/write's, write/read's, etc., the request 328 can be determined to be incompatible with the shared lock status (e.g., 320). In response, access to the tape volume can be withheld and the request 328 can be queued until the incompatible shared lock 320 is released. For instance, in the particular example of FIG. 3A, when access to the tape volume by both applications 305, 310 concludes, the queued request 328 can trigger the shared lock status 320 to be released and an exclusive lock 330 to be applied to the tape volume, the exclusive lock 330 locking the tape volume for exclusive access 332 by application 315. In the example of FIG. 3A, the session of the second application 310 is the last of the concurrent sessions to conclude, triggering the release of the shared status lock 320. In other instances, such as illustrated in the example of FIG. 3B, sessions that begin earlier than later concurrent sessions may nonetheless conclude after the later-started concurrent sessions (e.g., 326). In either instance, the shared status lock 320 can be released upon the conclusion of all of the concurrent access sessions (e.g., 324, 326) under the shared status lock 320.

As with the shared status lock 320, an exclusive lock 330 can also block or hold incompatible requests to access the virtual tape volume. In the case of an exclusive lock (e.g., 330) all access requests for a tape volume that are received while the tape volume is in exclusive lock can be queued until the access session (e.g., 332) concludes and the exclusive lock 330 is released. In the example of FIG. 3A, no competing access requests were received during the write access 332 of application 315 and no other requests have been queued. Consequently, in this particular example, when the exclusive lock 330 is released, the lock for the virtual tape volume transitions back to a shared status lock 320 until a next request is received. In cases where additional requests had been received or were queued, upon conclusion of the session 332, the exclusive lock for application 315 is released and a new lock status is determined for the next request in the queue depending on whether the access request implicates output processing or not.

Turning to the example of FIG. 3B, while techniques and systems that apply multi-level locks to virtual tape volumes to enable concurrent access to such volume can overcome some of the shortcomings of systems that rely exclusively on aliasing of tape volume VOLSERs, in some implementations, aliasing can also be utilized together with multi-level locking. For instance, in the example of FIG. 3B, the request 325 for a virtual tape volume already in use (e.g., 324) by another application (e.g., 305) can be enabled under a shared status lock determined at open time. Further, in open time, the second request 325 can initially be identified as applying to the same VOLSER (e.g., "ABC123"), allowing processes, such as security checks and other scans, to identify that the second request 325 also applies to the same virtual tape volume. However, allocation rules can be relaxed in such implementations by virtue of the multi-level locking system. This notwithstanding, some components of a system, such as a mainframe, may still include logic that trigger errors upon (or are otherwise incompatible with) identifying that a VOLSER of a particular virtual tape volume is being or attempting to be accessed by two or more applications (e.g., 305, 310) concurrently. Accordingly, in one example implementation, a request (e.g., 325), while initially passed from allocation to open referencing the original, or true, VOLSER of the virtual tape volume, can have its reference to the virtual tape volume changed 333 to an alias, such as a pseudo VOLSER, in response to determining that concurrent access (e.g., 326) to the virtual tape volume by the second application 310 can be permitted. Additionally, assignment of an alias to the request's 325 reference of the virtual tape volume can be timed such that the original VOLSER is preserved during that portion of open time where reference to the original VOLSER is desirable (e.g., during security checks relating to the request 325) and changed 333 to the alias VOLSER to coincide with other checks that would be sensitive to a reference to a virtual tape volume already under access (e.g., 324) by another application (e.g., 305), among other example features, implementations, and alternatives. Aliasing can nonetheless introduce additional difficulties, such as in instances where an application 310 using the alias VOLSER 333 runs longer than the other application 305 potentially resulting in an over-write or re-write of data while it is still being read by the application 310, or in a bypass of security controls since an alternate file-name could be used. In some implementations, aliasing can be avoided or restricted entirely.

Figure 3C:
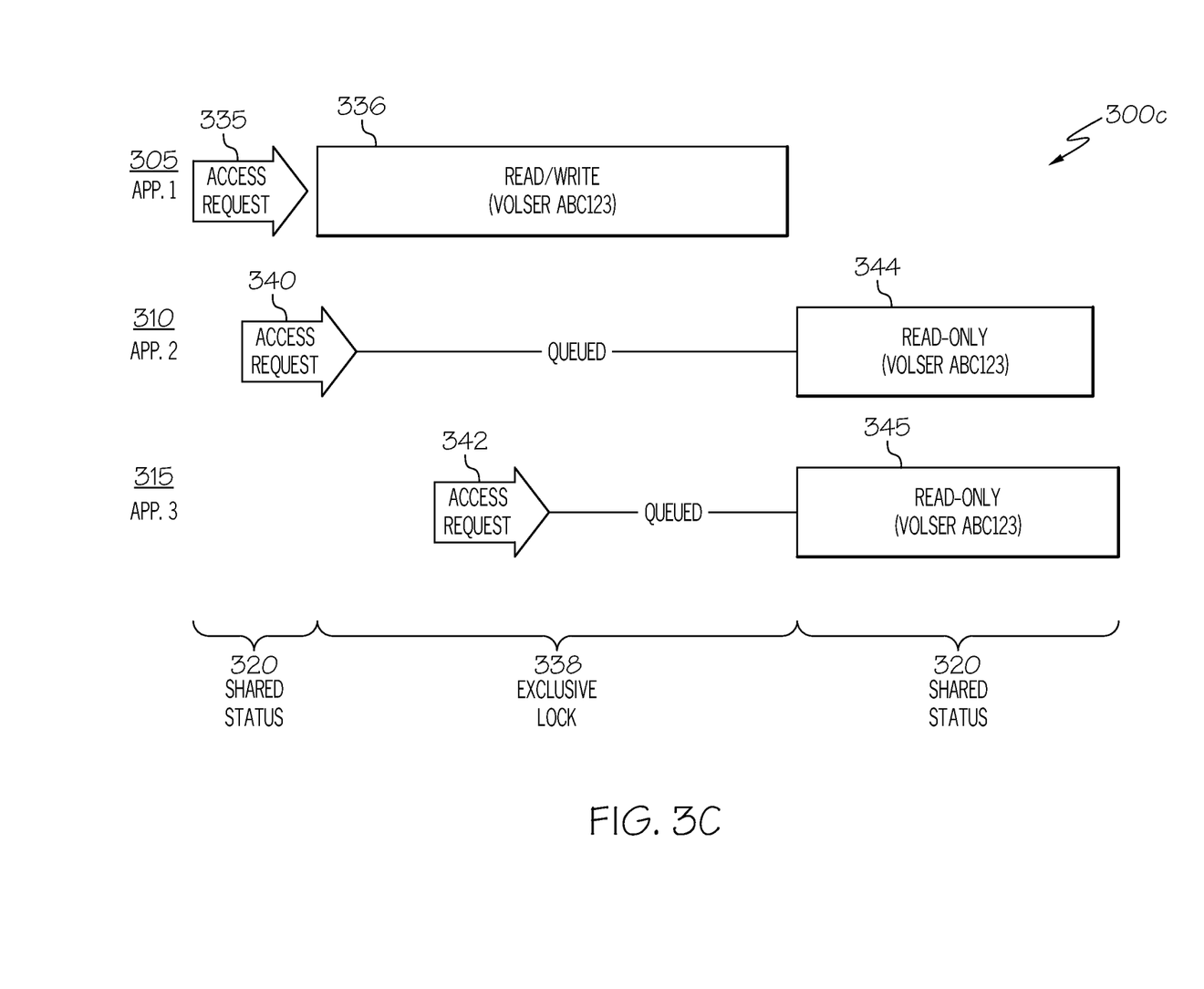

Turning to FIG. 3C, another example is illustrated. In the particular example of FIG. 3C, a first application 305 makes a request 335 for a particular virtual tape volume. The request 335 to access the particular virtual tape volume is analyzed to determine that the request is to include writes, or outputs, to the virtual tape volume. When the request 335 is received, the virtual tape volume is in shared status 320, but no other application (e.g., 310, 315) is accessing the tape volume. As a result, in this example, access 336 is granted to the first application 305 on the basis of the request 335 and because the access session 336 is to include writes, an exclusive lock 338 is applied to the tape volume that grants exclusive access to the tape volume to the first application 305. Accordingly, when additional requests 340, 342 are received from other application 310, 315 to access the same virtual tape volume, these requests 340, 342 are blocked or held by virtue of the exclusive lock 338 and queued. The nature of these intervening requests 340, 342 can be identified and serve as the basis for how the requests are handled following the release of the exclusive lock 338 on the virtual tape volume. For instance, when the access session 336 of the first application 305 concludes, the exclusive lock can be released and because each of requests 340, 342 are read-only requests, concurrent access 344, 345 can be granted to the application 310, 315 by transitioning the lock status of the virtual tape volume from the exclusive lock 338 to the shared status lock 320 allowing such concurrent access 344, 345.

Figure 3D:
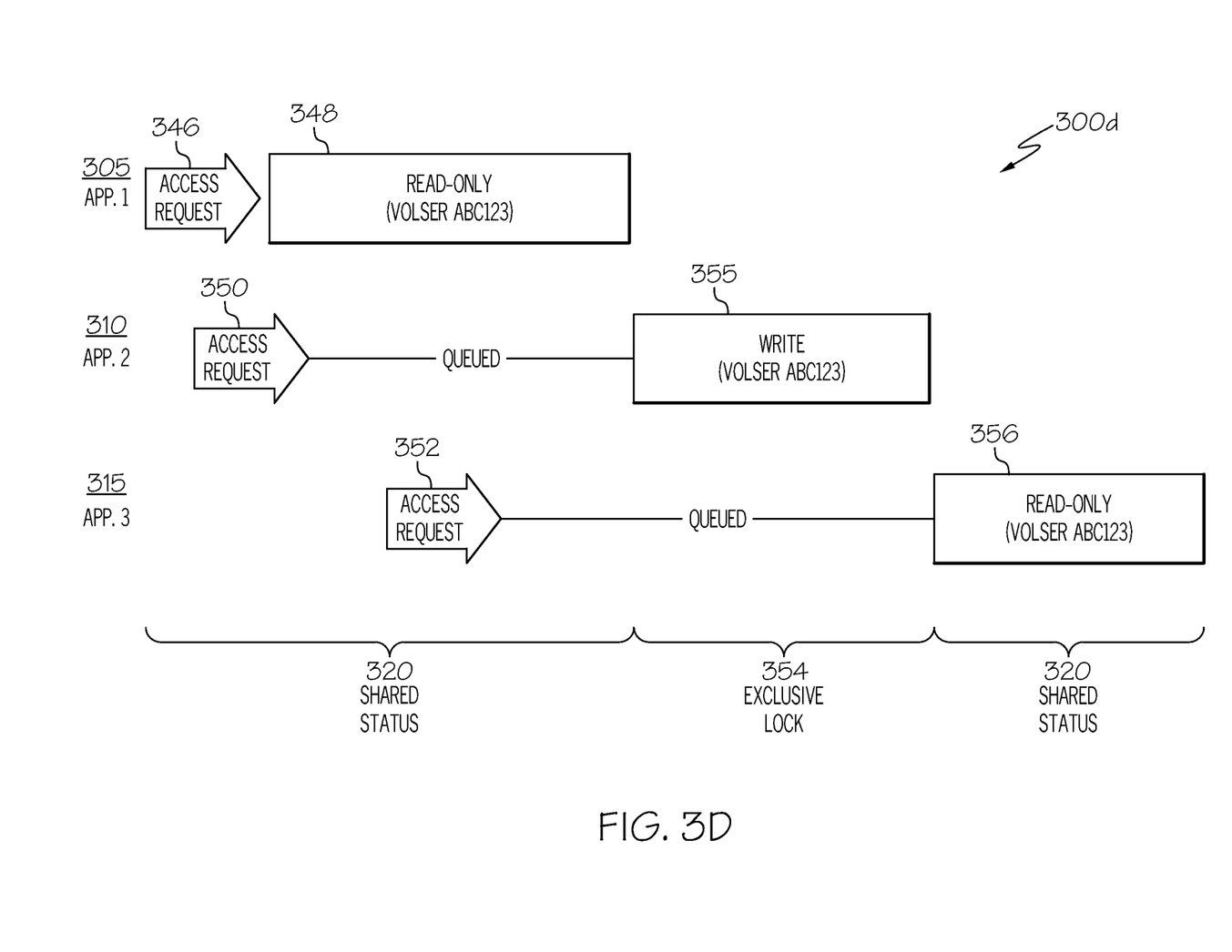

In another example, illustrated through the simplified block diagram 300d of FIG. 3D, a first application 305 can send an access request for read-only access 346 to a virtual tape volume while the virtual tape volume has shared lock status 320. Access 348 to the virtual tape volume can be granted, resulting in the shared status lock 320 being maintained throughout the duration of the access 348. Other access requests 350, 352 for the virtual tape volume can be received by other applications 310, 315 during the access 348 by the first application 305. In this particular example, a second application 310 first requests 350 write access (e.g., 355) to the virtual tape volume followed by a request 352 for read-only access by a third application 315. In some implementations, management of request queues can be on a strict first-in, first-out (FIFO) basis, with the application 310 requesting write access being permitted first access 355 to the virtual tape volume following the end of the first application's session 348 and the release of the shared status lock 320. In such an example, the second application 310 can be granted an exclusive lock 354 to the virtual tape volume and at the conclusion of the write access session 355, the exclusive lock 354 can be released, the lock transitioned back to shared status 320, and access 356 granted to the later-received access request 352 of the third application. In other implementations, when multiple intervening requests (e.g., 350, 352) for a resource are received during access (e.g., 348) by another application (e.g., 305)

under a shared lock 320, priority of the intervening requests can be, in part, determined from the nature of the requests and whether these requests can also make use of the current shared lock (e.g., 320). For instance, another request (e.g., 352) for read-only access, although received after a queued write access request (e.g., 350), can nonetheless be granted access to the virtual tape volume before the preceding write access request, in some alternative implementations, so as to take advantage of the opportunity to have the third requesting application (e.g., 315) have concurrent access to the virtual tape volume by virtue of its request for read-only access, among other potential examples and features.

Figure 4:
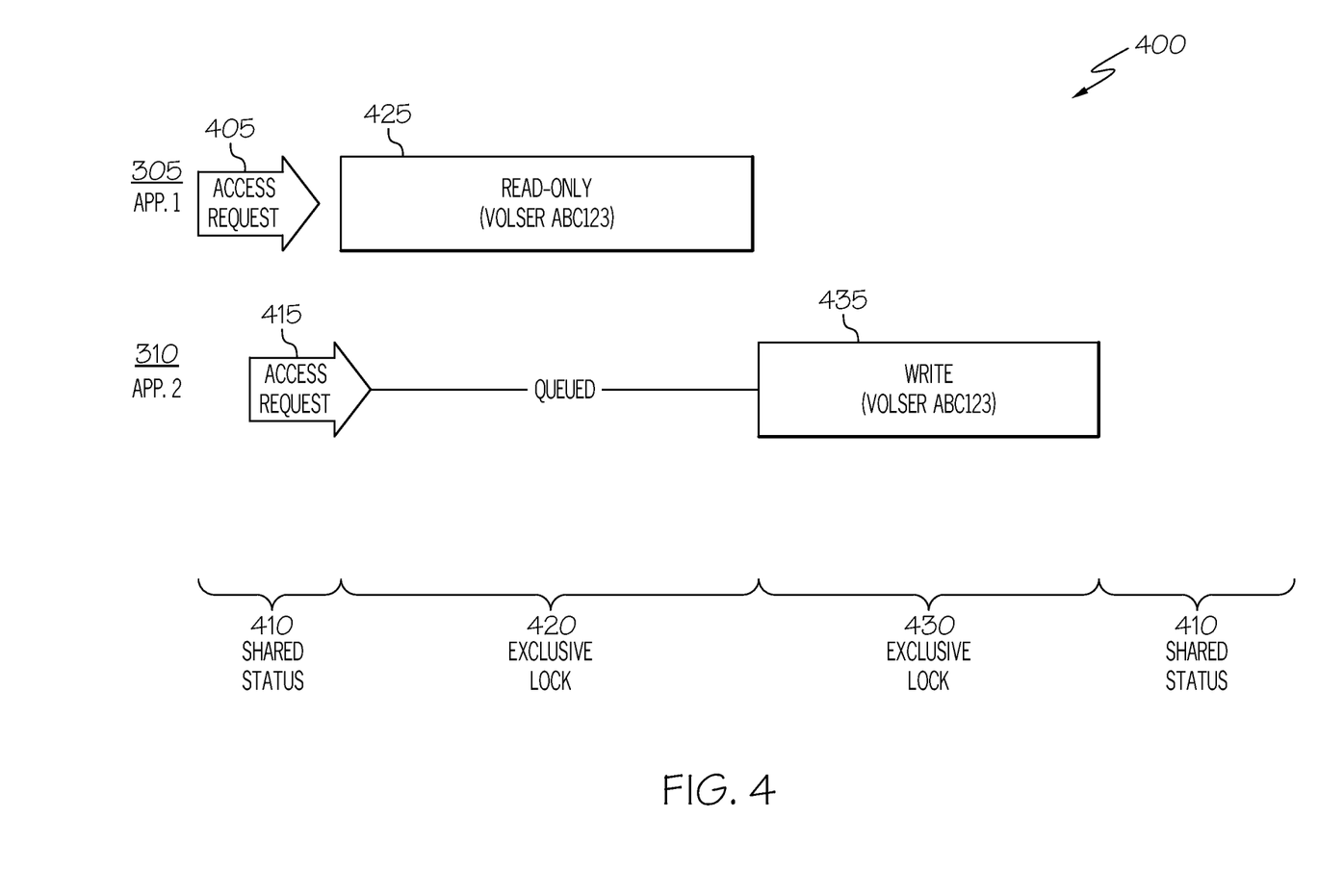
FIG. 4 is a simplified block diagram illustrating example lock management of an example physical tape volume in accordance with at least one embodiment.

Turning to FIG. 4, while virtual tape volumes can make use of a shared status lock to grant concurrent access to the virtual tape volume is some instances, such concurrent access may not be possible for physical tape volumes. As such, a tape management system or other component of a system used to provide access to data stored on tape volumes can additionally determine from an access request (e.g., 405, 415) whether the request is for a virtual or physical tape volume. In one example implementation, a shared lock (e.g., 410) can be applied as a default to all tape volumes, virtual or physical. As shown in the example of FIG. 4, however, when an access request 405 is identified as pertaining to the physical tape volume, at open time, the shared status lock can be removed and an exclusive lock applied, for all types of requests, including read-only access requests (e.g., 405). Accordingly, upon determining that a request applies to a physical tape volume, an exclusive lock 420 can be granted to a first application 305 for its read-only access 425 of the physical tape volume. All intervening requests (e.g., 415) for access to the physical tape volume can be queued following release of the first lock 420. The later request 415 can then be assigned another exclusive lock 430 for the later-requesting application (e.g., 310). In this particular example, following the conclusion of the later access 435, the exclusive lock 430 can be released returning the tape volume to shared status 410 until another access request is received and granted. In other implementations, such multi-level locking schemes may only be applied to virtual tape volumes in a system, with a different locking scheme applied to physical tape volumes that does not include a shared lock status, among other potential examples.

Figure 5A:
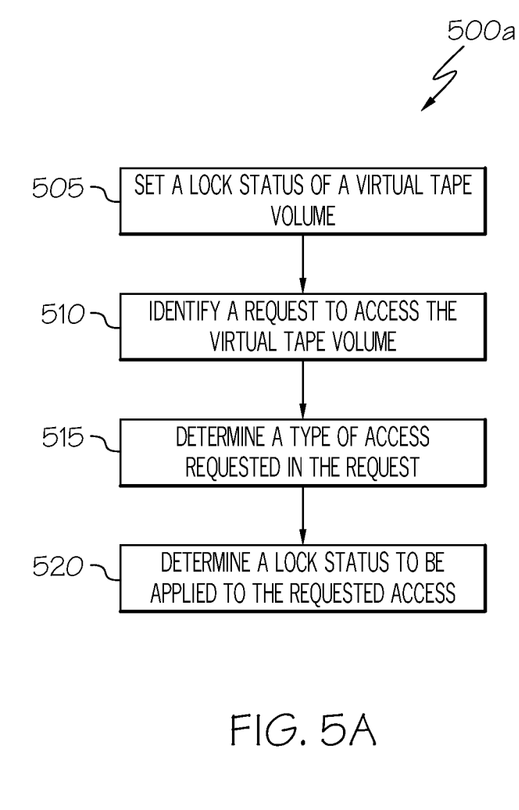
FIGS. 5A-5B are simplified flowcharts illustrating example techniques in connection with concurrent usage of a virtual tape volume in accordance with at least some embodiments.

FIG. 5A is a simplified flowchart 500a illustrating an example technique for managing a multi-level lock for controlling concurrent access to a particular virtual tape volume. A system, such as one or more components of the operating system of a mainframe computer, can set 505 a lock status of a virtual tape volume. For instance, the lock status can be set to a default value, such as a default shared lock status. The lock status of each of a plurality of tape volumes can be managed, including, in some examples, both physical and virtual tape volumes. For instance, each volume, as identified by a particular VOLSER, can have an accompanying lock and lock status. In one example, the lock can permit shared lock status or exclusive lock status.

A request to access the particular virtual tape volume can be identified 510. In some instances, identification 510 of the request can include receiving the request from a particular application and allocating the requested resources by identifying the particular virtual tape volume upon which the requested resources (e.g., files, tables, objects, etc.) reside. Allocation of the resource and virtual tape volume can be followed by processing the virtual tape volume for opening, for instance, by passing the request or data describing the request to a tape management system or other entity for processing. A type of access requested by the request can be determined 515. In some instances, the type of the access can be determined by parsing the request. In other instances, a tape management system can parse the request, identify the type of access requested, and indicate to the operating system the nature of the request, among other examples and alternatives. The type of access can include read-only access, write access, read/write access, write/read access, etc. The lock status to be applied to the access of the virtual tape volume can be determined 520, such as whether a shared lock or an exclusive lock status should be applied to the access session. In the case of a shared lock, other applications requesting access compatible with the shared lock status (e.g., other read-only access requests) can be granted concurrent access to the virtual tape volume. In the case of an exclusive lock status, the application currently accessing the virtual tape volume is granted exclusive access to the virtual tape volume and subsequent access requests can be queued pending release of the exclusive lock, among other examples.

Figure 5B:
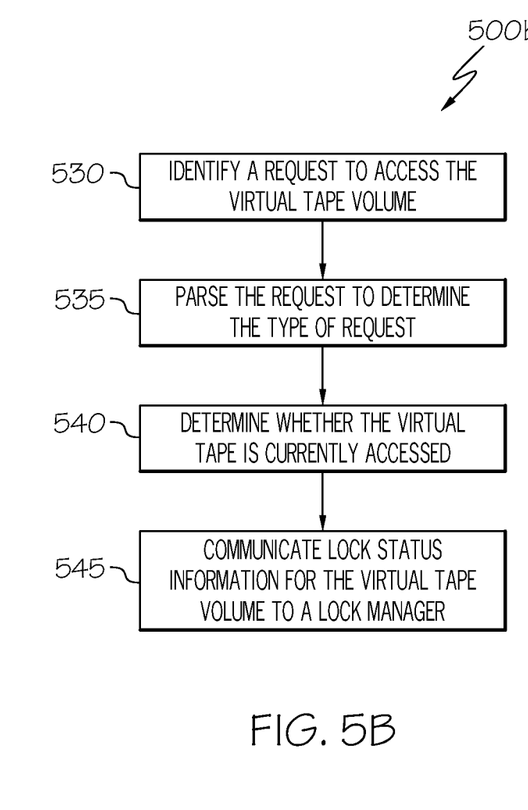

Turning to the example of FIG. 5B, a simplified flowchart 500b is shown illustrating an example technique for supporting the assignment of locks for a particular virtual tape volume. A request to access a virtual tape volume can be identified 530, for instance, in open time. The request can be parsed 535 or otherwise processed to identify the nature of the requested access, such as whether or not the requested access includes any form of output processing or write access. It can be further determined 540 whether a virtual tape volume is currently in use by another application and whether locks assigned for such use should be released or transitioned. Information concerning the current use of a virtual tape volume and the nature of a newly received access request can be determined and communicated (e.g., 545) to a lock manager or other component to indicate, or provide transparency into the access of the virtual tape volume to guide the lock manager in determining the lock to be applied to the access resulting from the newly received request as well as whether the request should be queued, etc. Additional information can also be determined and communicated, including whether the requested volume is virtual or physical, the VOLSER (and any pseudo VOLSERs to be assigned to the volume), among other examples.

While multiple components and subsystems can be utilized in combination to analyze access requests, grant and manage tape volume locks, and manage concurrent or queued access to virtual tape volumes in a system, in some alternative implementations, all of the functionality described, for instance, in FIGS. 5A and 5B, can be performed by a single component or subsystem. For instance, in some implementations, a tape management system can manage a multi-level locking scheme to be applied to virtual tape volumes, identify the nature of access requests, manage lock status of the tape volumes managed by the tape management system, manage access queues, manage concurrent access to a tape volume under a shared lock status, manage aliasing and security checks involving the requested tape volume, among other examples.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   setting a status of a particular virtual tape volume to a shared status, wherein the particular virtual tape volume is one of a plurality of tape volumes comprising virtual tape volumes and physical tape volumes, each of the plurality of tape volumes is referenced in a system by a respective unique volume serial number (VOLSER), and the particular virtual tape volume is referenced in the system by a particular VOLSER;
   identifying a request to access the particular virtual tape volume;
   determining a type of access to the particular virtual tape volume; and
   determining a lock status for the particular virtual tape volume, wherein the lock status is to be transitioned to an exclusive lock for requests for write access of the particular virtual tape volume, shared status is to be retained for requests for read-only access of the particular virtual tape volume, concurrent access to the particular virtual tape volume by two or more applications can be permitted during the shared status, and each of the two or more applications addresses the particular virtual tape volume by the particular VOLSER during the concurrent access.

2. The method of claim 1, wherein the request is determined to comprise a read-only request and shared status is maintained.

3. The method of claim 2, wherein the shared status is determined to be maintained during open time.

4. The method of claim 1, wherein the request comprises a first request by a first application and access to the particular virtual tape volume is granted to the first application, the method further comprising:
   identifying a second request by a second application to open the particular virtual tape volume during access of the particular virtual tape volume by the first application; and
   determining whether the lock status allows the second application to access the particular virtual tape volume concurrently with the first application during the shared status based on the second request.

5. The method of claim 4, wherein the first request comprises a request for read-only access to the particular virtual tape volume, the lock status is set to shared status during access to the particular virtual volume by the first application based at least in part on the first request, and the method further comprises:
   determining that the second request comprises a read-only request, wherein the second application is allowed to access the particular virtual tape volume concurrently with the first application based at least in part on determining that the second request comprises a read-only request.

6. The method of claim 4, wherein the first request comprises a request for read-only access to the particular virtual tape volume, the lock status is set to shared status during access to the particular virtual volume by the first application based at least in part on the first request, and the method further comprises:
   determining that the second request comprises a write access request of the particular virtual tape volume; and
   queuing the second request during the shared status.

7. The method of claim 6, further comprising:
   identifying an end of the access of the particular virtual tape volume by the first application; and
   transitioning to the exclusive lock status based on the second request and the end of the access of the particular virtual tape volume by the first application, wherein the second application accesses the particular virtual tape volume under the exclusive lock status.

8. The method of claim 7, further comprising:
   identifying an end of the access of the particular virtual tape volume by the second application; and
   transitioning back to the shared status based on the end of the access of the particular virtual tape volume by the second application.

9. The method of claim 1, wherein the request is determined to comprise write access of the particular virtual tape volume, the status is transitioned to the exclusive lock status based on the determined write access, and the exclusive lock status is to be maintained during the write access.

10. The method of claim 9, wherein the request comprises a first request by a first application, the method further comprising queuing other requests for access to the particular virtual tape volume during the exclusive lock status.

11. The method of claim 1, wherein the particular virtual tape volume comprises data of a direct access storage device (DASD) cache.

12. The method of claim 1, wherein exclusive lock status is to be applied to access of physical tape volumes.

13. A method comprising:
   identifying a request to access a virtual tape volume, wherein the request references the virtual tape volume by a particular volume serial number (VOLSER), the particular virtual tape volume is one of a plurality of tape volumes comprising virtual tape volumes and physical tape volumes, and each of the plurality of tape volumes is referenced in a system by a respective unique VOLSER;

identifying that a lock status of the particular virtual tape volume is set to a shared status, wherein the lock status can transition between a plurality of lock levels, the plurality of lock levels comprising the shared status and an exclusive lock;

determining whether the request comprises a request for write access to the particular virtual tape volume; and allowing concurrent access to the particular virtual tape volume by two or more applications during the shared status, wherein each of the two or more applications addresses the particular virtual tape volume by the particular VOLSER during the concurrent access.

14. The method of claim 13, further comprising determining that the request is for a virtual tape volume, wherein concurrent access to physical tape volumes are not to be granted.

15. The method of claim 13, wherein concurrent access is not to be granted when the virtual lock status is set to the exclusive lock.

16. The method of claim 15, wherein the lock status is to be set to the exclusive when the particular virtual tape volume is under write access by an application.

17. The method of claim 13, wherein the lock status is to be set to the shared status when the particular virtual tape volume is under read-only access by an application.

18. The method of claim 13, wherein a default of the lock status is the shared status.

19. The method of claim 13, further comprising indicating whether access to the particular virtual tape volume can be granted based at least in part on the lock status and whether the request comprises a request for write access.

20. The method of claim 13, wherein the request is determined to be a request for read-only access by a first application, the method further comprising:
identifying that a second application is accessing the particular virtual tape volume under the shared status;
granting concurrent access to the first and second applications to the particular virtual tape volume under the shared status.

21. A computer program product comprising a computer readable storage medium comprising computer readable program code embodied therewith, the computer readable program code comprising:
computer readable program code configured to set a status of a particular virtual tape volume to a shared status, wherein the particular virtual tape volume is one of a plurality of tape volumes comprising virtual tape volumes and physical tape volumes, each of the plurality of tape volumes is referenced in a system by a respective unique volume serial number (VOLSER), and the particular virtual tape volume is referenced in the system by a particular VOLSER;
computer readable program code configured to identify a request to access the particular virtual tape volume;
computer readable program code configured to determine a type of access to the particular virtual tape volume;
computer readable program code configured to determine a lock status for the particular virtual tape volume, wherein the lock status is to be transitioned to an exclusive lock for requests for write access of the particular virtual tape volume, shared status is to be retained for requests for read-only access of the particular virtual tape volume, concurrent access to the particular virtual tape volume by two or more applications can be permitted during the shared status, and each of the two or more applications addresses the particular virtual tape volume by the particular VOLSER during the concurrent access.

22. A computer program product comprising a computer readable storage medium comprising computer readable program code embodied therewith, the computer readable program code comprising:
computer readable program code configured to identify a request to access a virtual tape volume, wherein the request references the virtual tape volume by a particular volume serial number (VOLSER), the particular virtual tape volume is one of a plurality of tape volumes comprising virtual tape volumes and physical tape volumes, and each of the plurality of tape volumes is referenced in a system by a respective unique VOLSER;
computer readable program code configured to identify that a lock status of the particular virtual tape volume is set to a shared status, wherein the lock status can transition among a plurality of lock levels, the plurality of lock levels comprising the shared status and an exclusive lock;
computer readable program code configured to determine whether the request comprises a request for write access to the particular virtual tape volume; and
computer readable program code configured to allow concurrent access to the particular virtual tape volume by two or more applications during the shared status, wherein each of the two or more applications addresses the particular virtual tape volume by the particular VOLSER during the concurrent access.

23. A system comprising:
a processor device;
a memory element;
a tape management system to:
allow concurrent access to the particular virtual tape volume by two or more applications, wherein concurrent access is allowed when a lock status of the particular virtual tape volume is set to a shared status and access by each of the two or more applications comprises read-only access to the particular virtual tape volume, and each of the two or more applications addresses the virtual tape volume by a particular volume serial number (VOLSER) of the particular virtual tape volume during the concurrent access, wherein the particular virtual tape volume is one of a plurality of tape volumes comprising virtual tape volumes and physical tape volumes, and each of the plurality of tape volumes is referenced in a system by a respective unique VOLSER; and
a lock manager to:
manage lock status of each of the plurality of virtual tape volumes, wherein management of the lock status comprises transitioning between a plurality of lock levels, the plurality of lock levels comprising the shared status and an exclusive lock status, wherein access to a tape volume is to be restricted to a single application during the exclusive lock status.

24. The system of claim 23, further comprising the plurality of virtual tape volumes.

25. The system of claim 24, wherein the tape management system is further to determine whether a request is for a virtual tape volume or physical tape volume and exclusive lock status is to be applied to all access of the physical tape volumes.

26. The system of claim 23, further comprising a mainframe operating system.

27. The system of claim 23, further comprising a security tool to perform a security task based on a volume serial number of the particular virtual tape volume.

* * * * *